(12) United States Patent
Hanson et al.

(10) Patent No.: US 12,378,334 B2
(45) Date of Patent: Aug. 5, 2025

(54) METHODS OF REDUCING FRICTION ON A SURFACE OF AN APPARATUS THAT STORES OR TRANSPORTS A GAS

(71) Applicant: ACULON, INC., San Diego, CA (US)

(72) Inventors: Eric L. Hanson, Carlsbad, CA (US); Eric L. Bruner, La Jolla, CA (US); Majid Monji, San Diego, CA (US); Elizabeth Cambre, Texas City, TX (US); Edward Hughes, San Diego, CA (US)

(73) Assignee: ACULON INC., San Diego, CA (US)

( * ) Notice: Subject to any disclaimer, the term of this patent is extended or adjusted under 35 U.S.C. 154(b) by 0 days.

(21) Appl. No.: 18/538,293

(22) Filed: Dec. 13, 2023

(65) Prior Publication Data

US 2024/0199968 A1 Jun. 20, 2024

Related U.S. Application Data

(60) Provisional application No. 63/432,215, filed on Dec. 13, 2022.

(51) Int. Cl.
| | | |
|---|---|---|
| C08F 120/56 | (2006.01) | |
| B01F 25/312 | (2022.01) | |
| C08G 65/00 | (2006.01) | |
| C08G 65/22 | (2006.01) | |
| C08J 7/04 | (2020.01) | |
| C09D 5/16 | (2006.01) | |
| C09D 171/00 | (2006.01) | |
| C09D 171/02 | (2006.01) | |
| C09K 8/88 | (2006.01) | |
| C10M 105/74 | (2006.01) | |
| C10N 40/00 | (2006.01) | |
| C23F 11/173 | (2006.01) | |
| E21B 43/08 | (2006.01) | |
| F17C 13/00 | (2006.01) | |

(52) U.S. Cl.
CPC .......... *C08F 120/56* (2013.01); *C08G 65/007* (2013.01); *C08G 65/226* (2013.01); *C08J 7/042* (2013.01); *C09D 5/1662* (2013.01); *C09D 5/1693* (2013.01); *C09D 171/00* (2013.01); *C09D 171/02* (2013.01); *C09K 8/882* (2013.01); *C10M 105/74* (2013.01); *C23F 11/173* (2013.01); *E21B 43/08* (2013.01); *F17C 13/004* (2013.01); *B01F 25/31243* (2022.01); *C09K 2208/34* (2013.01); *C10M 2223/0603* (2013.01); *C10N 2040/00* (2013.01); *F17C 2201/0109* (2013.01); *F17C 2221/01* (2013.01); *F17C 2270/01* (2013.01)

(58) Field of Classification Search
CPC ............ B01F 25/31243; C08F 120/56; C08G 65/007; C08G 65/226; C08J 7/042; C09D 5/1662; C09D 5/1693; C09D 171/00; C09D 171/02; C09K 8/52; C09K 8/80; C09K 8/882; C09K 2208/34; C10M 105/74; C10M 2223/0603; C10N 2040/00; C23F 11/173; E21B 43/08; F17C 13/004; F17C 2201/0109; F17C 2221/01; F17C 2270/01
See application file for complete search history.

(56) References Cited

U.S. PATENT DOCUMENTS

| | | | |
|---|---|---|---|
| 2015/0192229 A1* | 7/2015 | Goto | C10M 177/00 285/94 |
| 2015/0210951 A1* | 7/2015 | Aizenberg | B05D 5/08 141/1 |
| 2019/0040195 A1* | 2/2019 | Takao | C08G 65/327 |

* cited by examiner

*Primary Examiner* — James C Goloboy
(74) *Attorney, Agent, or Firm* — Blynn L. Shideler; Krisanne Shideler; BLK Law Group

(57) ABSTRACT

The present invention provides methods of reducing friction on a surface of an apparatus that stores or transports a gas, comprising: (a) contacting the surface either directly or through an intermediate organometallic layer with a fluorinated material in a diluent, wherein the fluorinated material has the following structure:

$$C_nF_{2n+1}-A-(CF-CF_2-O)_b-(CX-CH_2-O)_m(CH_2)_p-Z$$
$$\phantom{C_nF_{2n+1}-A-(}|\phantom{F-CF_2-O)_b-(}|$$
$$\phantom{C_nF_{2n+1}-A-(CF-CF_2-O)_b-(}Y\phantom{CH_2-O)_m(CH}Y$$

wherein A is an oxygen radical or a chemical bond; n is 1 to 20; Y is H, F, $C_nH_{2n+1}$ or $C_nF_{2n+1}$; X is H or F; b is at least 1, m is 0 to 50, p is 1 to 20, and Z is an acid group or an acid derivative; (b) forming a hydrophobic surface layer on the surface; and (c) introducing the gas into the apparatus.

16 Claims, No Drawings

METHODS OF REDUCING FRICTION ON A SURFACE OF AN APPARATUS THAT STORES OR TRANSPORTS A GAS

CROSS REFERENCE TO RELATED APPLICATION

The present application claims priority to U.S. Provisional Patent Application Ser. No. 63/432,215, filed Dec. 13, 2022, titled "Surface-Treated, Transportable ISO Tanks and Deposition Reduction of a Friction Reducer; Eductors having Hydrophobic Surfaces and Deposition Reduction of a Friction Reducer; Surface-Treated Gravel Pack Screens and Deposition Reduction of a Contaminant Thereon; Methods of Reducing Friction on an Apparatus that Stores or Transports a Gas; and Methods of Reducing Deposition of a Contaminant on a Metal Cutting Blade", which application is incorporated herein by reference in its entirety.

FIELD OF THE INVENTION

The present invention relates to methods of reducing friction on a surface of an apparatus that stores or transports a gas.

BACKGROUND OF THE INVENTION

Industrial gases such as carbon dioxide and hydrogen are typically stored and transported in metal conduits and containers such as pipelines and tanks. Carbon dioxide is often used in operations such as closed loop geothermal wells, injector wells, and EOR (enhanced oil recovery) operations. The gases not only need to be transported to a site, they are also conducted through equipment during production processes.

The large volumes of gas pumped during transport operations, and high rates required, can cause high friction pressures from turbulent fluid flow, increasing energy consumption.

It would be desirable to provide methods of reducing friction on a surface of an apparatus that stores or transports a gas.

SUMMARY OF THE INVENTION

The present invention is directed to methods of reducing friction on a surface of an apparatus that stores or transports a gas, comprising:
(a) contacting the surface either directly or through an intermediate organometallic layer with a fluorinated material in a diluent, wherein the fluorinated material has the following structure:

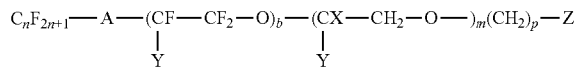

wherein A is an oxygen radical or a chemical bond; n is 1 to 20; Y is H, F, $C_nH_{2n+1}$ or $C_nF_{2n+1}$; X is H or F; b is at least 1, m is 0 to 50, p is 1 to 20, and Z is an acid group or an acid derivative;
(b) forming a hydrophobic surface layer on the surface; and
(c) introducing the gas into the apparatus.

These and other advantages of the present invention will be clarified in the following description of the present invention.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

As used herein, "formed from" denotes open, e.g., "comprising," claim language. As such, it is intended that a composition "formed from" a list of recited components be a composition comprising at least these recited components, and can further comprise other, non-recited components, during the composition's formation.

As used herein, the term "inorganic material" means any material that is not an organic material.

As noted above, the present invention is directed to methods of reducing friction on a surface, typically an interior surface, of an apparatus that stores or transports a gas such as methane, $CO_2$ or hydrogen. Exemplary apparatuses include vessels such as tanks, conduits such as pipelines, and the like. Particular examples include components of a closed loop $CO_2$ geothermal well, storage wells, pipes, and $CO_2$ injector wells for Enhanced Oil Recovery (EOR) and Coal Bed Methane (CBM) extraction operations. The apparatus typically has an interior metal surface that comes into contact with the gas. The metal surface is usually steel, such as a stainless steel surface to minimize corrosion.

The metal surface is surface-treated with a hydrophobic surface layer applied thereto. The hydrophobic surface layer comprises a self-assembled monolayer prepared from a fluorinated material in a treatment composition. The fluorinated material has the following structure:

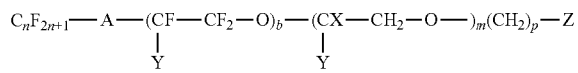

wherein A is an oxygen radical or a chemical bond; n is 1 to 20; Y is H, F, $C_nH_{2n+1}$ or $C_nF_{2n+1}$; X is H or F; b is at least 1, m is 0 to 50, p is 1 to 20, and Z is an acid group or an acid derivative.

In particular examples of the present invention, n is 1 to 6; b is 5 to 12, m is 1 to 6, and p is 2 to 4. Often, Z is selected from:

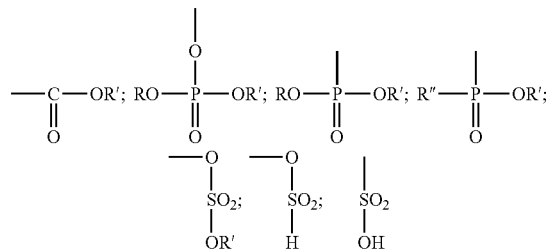

where R″ is a hydrocarbon or substituted hydrocarbon radical having up to 200 carbons, and R and R′ are each independently H, a metal or an amine or an aliphatic or substituted aliphatic radical having 1 to 50 carbons or an aryl or substituted aryl radical having 6 to 50 carbons. Typically, Z is

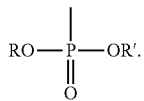

The treatment composition may further comprise a diluent to form a solution. Suitable diluents include alcohols such as methanol, ethanol or propanol; aliphatic hydrocarbons such as hexane, isooctane and decane, ethers, for example, tetrahydrofuran and dialkylethers such as diethylether. Diluents for fluorinated materials can include perfluorinated compounds perfluorinated tetrahydrofuran. Also, aqueous alkaline solutions such as sodium and potassium hydroxide can be used as the diluent. In certain examples of the present invention, the diluent may comprise a slow-drying solvent such as glycols, glycol ethers, and hydrofluoroether solvents. Examples of particular hydrofluoroether solvents include 1,1,1,2,2,3,3,4,4-nonafluoro-4-methoxybutane and/or 1,1,1,2,2,3,3,4,4-nonafluoro-4-ethoxybutane, commercially available from 3M Corporation as NOVEC 7200. Other exemplary solvents include 3-ethoxyperfluoro(2-methylhexane) (HFE 7500, also available from 3M Corporation); 1H,1H,5H-Octafluoropentyl-1,1,2,2-tetrafluoroethyl ether (HFE 6512, available from Fuxin Hengtong); and/or 1,1,1,2,3,4,4,5,5,5-Decafluoropentane (VERTREL XF, available from E. I. DuPont de Nemours). Slower drying solvents provide application latitude and control, and are particularly useful when the treatment composition is to be used in regions with warmer weather, and where climate control is not available.

Adjuvant materials may be present in the treatment composition. Examples include surface active agents, stabilizers, and anti-static agents. The adjuvants if present are present in amounts of up to 30 percent by weight, based on the non-volatile content of the treatment composition.

The concentration of the fluorinated material in the solution is not particularly critical but is at least 0.01 millimolar, typically 0.01 to 100 millimolar, and more typically 0.1 to 50 millimolar. The solution can be prepared by mixing all of the components at the same time or by adding the components in several steps.

The treatment composition can be contacted with the metal surface typically by immersion (which allows for coating both the interior and exterior surfaces), spraying, flow coating, brush application or the like, followed by evaporating the solution medium at ambient temperatures or by the application of heat to effect formation of the self-assembled monolayer. The treatment composition may also be applied by wiping with a cloth. Slower drying solvents in the formulation are particularly useful for wipe application to minimize waste. The treatment composition may also be allowed to flow through the apparatus after the apparatus is in-line ("in situ"). This allows for the treatment of other line components associated with, but not integral to, the apparatus.

Adherence of the hydrophobic surface layer to the metal may be through physical attraction or through chemically bonding. With physical attraction it is believed the group Z is in the form of the acid, rather than a salt or ester. In the case of chemical bonding, it is believed the acid forms an ionic or covalent bond with reactive groups on the metal surface.

The resultant self-assembled monolayer typically is of nano dimensions, having a thickness of no greater than 100 nm, typically about 10-100 nanometers. The layer is hydrophobic, having a water contact angle greater than 70°, typically from 75-130°. The water contact angle can be determined using a contact angle goniometer such as a TANTEC contact angle meter Model CAM-MICRO.

The hydrophobic surface layer may be adhered to the metal surface either directly or indirectly through an intermediate organometallic coating. When better adhesion and durability than that afforded by direct application is desired, an organometallic coating should be applied to the metal surface followed by application of the treatment composition.

The organometallic compound used in the intermediate organometallic coating is usually derived from a metal or metalloid, often a transition metal, selected from Group III and Groups IIIB, IVB, VB and VIB of the Periodic Table. Transition metals are used most often, such as those selected from Groups IIIB, IVB, VB and VIB of the Periodic Table. Examples are tantalum, titanium, zirconium, lanthanum, hafnium and tungsten. Niobium is also a suitable metal. The organo portion of the organometallic compound is selected from those groups that are reactive with the organophosphorus acid. Also, the organo group of the organometallic compound is believed to be reactive with groups on the surfaces being treated such as oxide and hydroxyl groups. Examples of suitable organo groups of the organometallic compound are alkoxide groups containing from 1 to 18, usually 2 to 4 carbon atoms, such as ethoxide, propoxide, isopropoxide, butoxide, isobutoxide, tert-butoxide and ethylhexyloxide. Mixed groups such as alkoxide, acetyl acetonate and chloride groups can be used.

The organometallic compounds can be in the form of simple alkoxylates or polymeric forms of the alkoxylate, and various chelates and complexes. For example, in the case of titanium and zirconium, the organometallic compound can include one or more of:
a) alkoxylates of titanium and zirconium having the general formula $M(OR)_4$, wherein M is selected from Ti and Zr and R is $C_{1-18}$ alkyl,
b) polymeric alkyl titanates and zirconates obtainable by condensation of the alkoxylates of (a), i.e., partially hydrolyzed alkoxylates of the general formula $RO[-M(OR)_2O-]_{x-1}R$, wherein M and R are as above and x is a positive integer,
c) titanium chelates, derived from ortho titanic acid and polyfunctional alcohols containing one or more additional hydroxyl, halo, keto, carboxyl or amino groups capable of donating electrons to titanium. Examples of these chelates are those having the general formula:

$$Ti(O)_a(OH)_b(OR')_c(XY)_d$$

wherein a=4–b–c–d; b=4–a–c–d; c=4–a–b–d; d=4–a–b–c; R' is H, $C_{1-18}$ alkyl, or X—Y, wherein X is an electron donating group such as oxygen or nitrogen and Y is an aliphatic radical having a two- or three-carbon atom chain such as
I. —$CH_2CH_2$—e.g., of ethanolamine, diethanolamine and triethanolamine
II.

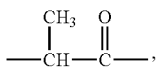

e.g., of lactic acid;
III.

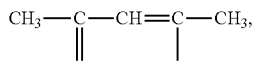

e.g., of acetylacetone enol form; or
IV.

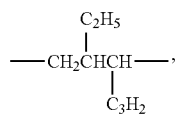

e.g., as in 1,3-octyleneglycol;
d) titanium acrylates having the general formula $Ti(OCOR)_{4-n}(OR)$, wherein R is $C_{1-18}$ alkyl as above and n is an integer of from 1 to 3, and polymeric forms thereof, or
e) mixtures thereof.

The organometallic compound can be dissolved or dispersed in a diluent to form a solution. Examples of suitable diluents are alcohols such as methanol, ethanol and propanol, aliphatic hydrocarbons, such as hexane, isooctane and decane, ethers, for example, tetrahydrofuran and dialkyl ethers such as diethyl ether. The concentration of the organometallic compound in the solution is not particularly critical but is usually at least 0.01 millimolar, typically from 0.01 to 100 millimolar, and more typically from 0.1 to 50 millimolar.

Also, adjuvant materials may be present in the solution. Examples include stabilizers such as sterically hindered alcohols, surfactants and anti-static agents. The adjuvants if present are present in amounts of up to 30 percent by weight, based on the non-volatile content of the composition.

The organometallic treatment solution can be prepared by mixing all of the components at the same time or by combining the ingredients in several steps. If the organometallic compound chosen is reactive with moisture, (e.g. in the case of titanium (IV) n-butoxide, tantalum (V) ethoxide, aluminum (III) isopropoxide, etc.), care should be taken that moisture is not introduced with the diluent or adjuvant materials and that mixing is conducted in a substantially anhydrous atmosphere.

The organometallic solution can be contacted with the metal surface typically by immersion, spraying, flow coating, brush application or the like, followed by removing excess solution and evaporating the diluent. This can be accomplished by heating to 50-200° C. or by simple exposure to ambient temperature, that is, from 20-25° C. Alternatively, the organometallic compound can be used neat and applied by vapor deposition techniques.

The resulting film may be in the form of a polymeric metal oxide with unreacted alkoxide and hydroxyl groups. This is accomplished by depositing the film under conditions resulting in hydrolysis and self-condensation of the alkoxide. These reactions result in a polymeric metal oxide coating being formed. The conditions necessary for these reactions to occur is to deposit the film in the presence of water, such as a moisture containing atmosphere; however, these reactions can be performed in solution by the careful addition of water. The resulting film has some unreacted alkoxide groups and/or hydroxyl groups for subsequent reaction and possible covalent bonding with the organophosphorus acid. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

Although not intending to be bound by any theory, it is believed the polymeric metal oxide is of the structure:

$$[M(O)_x(OH)_y(OR)_z]_n$$

where M is the metal being used, R is an alkyl group containing from 1 to 30 carbon atoms; x+y+z=V, the valence of M; x is at least 1, y is at least 1, z is at least 1; x=V–y–z; y=V–x–z; z=V–x–y; n is greater than 2, such as 2 to 1000.

When the organometallic compound is used neat and applied by chemical vapor deposition techniques in the absence of moisture, a thin metal alkoxide film is believed to form. Polymerization, if any occurs, is minimized and the film may be in monolayer configuration. The resulting film typically has a thickness of 0.5 to 100 nanometers. When the organometallic compound is subjected to hydrolysis and self-condensation conditions as mentioned above, somewhat thicker films are formed.

Although not intending to be bound by any theory, it is believed the acid groups of the Z moiety chemically bond with oxide or hydroxyl groups on the metal surface or chemically bond with the hydroxyl or alkoxide group of the organometallic coating, resulting in a durable film. It is believed that the fluorinated material forms a self-assembled monolayer on the surface of the substrate (i.e., the metal surface or organometallic coating layer). Self-assembled layers or films are formed by the chemisorption and spontaneous organization of the material on the surface of the substrate. The fluorinated materials useful in the practice of the invention are amphiphilic molecules that have two functional groups. The first functional group, i.e., the head functional group, is the acid group and attaches by physical attraction or by chemical bonding to the surface of the substrate. The second functional group, the fluoro-functional group, i.e., the tail, extends outwardly from the surface of the substrate.

Typically, the hydrophobic surface layer is adhered to the metal surface on the interior surfaces of the apparatus, thereby reducing friction when a gas is introduced into and/or transported through the apparatus.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A method of reducing friction on a metal surface of an apparatus that stores or transports a gas, the method comprising:
   (a) contacting the surface either directly or through an intermediate organometallic layer with a fluorinated material in a diluent, wherein the fluorinated material has the following structure:

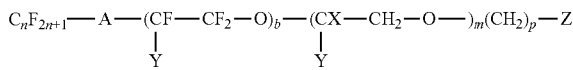

wherein A is an oxygen radical or a chemical bond; n is 1 to 20; Y is H, F, $C_nH_{2n+1}$ or $C_nF_{2n+1}$; X is H or F; b is at least 1, m is 0 to 50, p is 1 to 20, and Z is an acid group or an acid derivative; (b) forming a hydrophobic surface layer on the metal surface; and (c) introducing the gas into the apparatus, wherein Z is

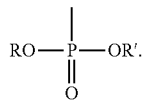

where R and R' are each independently H, a metal or an amine or an aliphatic or substituted aliphatic radical having 1 to 50 carbons or an aryl or substituted aryl radical having 6 to 50 carbons.

2. The method of claim 1 wherein the apparatus comprises a component of a closed loop $CO_2$ geothermal well, a storage well, a pipe, or an injector well.

3. The method of claim 2 wherein the surface comprises stainless steel.

4. The method of claim 1 wherein the fluorinated material is dissolved or dispersed in a diluent to form a solution or dispersion, and the solution or dispersion is coalesced on the surface to form the hydrophobic surface layer.

5. The method of claim 1 wherein n is 1 to 6; b is 5 to 12, m is 1 to 6, and p is 2 to 4.

6. The method of claim 1 wherein the fluorinated material in the hydrophobic surface layer is adhered to an intermediate organometallic layer.

7. A method of reducing friction on a metal surface of an apparatus that stores or transports a gas, the method comprising:
   (a) contacting the surface either directly or through an intermediate organometallic layer with a fluorinated material in a diluent, wherein the fluorinated material has the following structure:

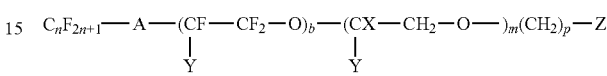

wherein A is an oxygen radical or a chemical bond; n is 1 to 20; Y is H, F, $C_nH_{2n+1}$ or $C_nF_{2n+1}$; X is H or F; b is at least 1, m is 0 to 50, p is 1 to 20, and Z is an acid group or an acid derivative;
   (b) forming a hydrophobic surface layer on the metal surface; and
   (c) introducing the gas into the apparatus, wherein the fluorinated material in the hydrophobic surface layer is adhered to an intermediate organometallic layer and wherein the intermediate organometallic layer is a polymeric metal oxide with alkoxide and hydroxyl groups.

8. The method of claim 1, wherein the diluent comprises at least one of a glycol, a glycol ether, 1,1,1,2,2,3,3,4,4-nonafluoro-4-methoxybutane, 1,1,1,2,2,3,3,4,4-nonafluoro-4-ethoxybutane, 3-ethoxyperfluoro (2-methylhexane), 1H,1H,5H-Octafluoropentyl-1,1,2,2-tetrafluoroethyl ether, and 1,1,1,2,3,4,4,5,5,5-Decafluoropentane.

9. The method of claim 1, wherein the gas comprises $CO_2$ or hydrogen.

10. The method of claim 1, wherein the gas comprises $CO_2$.

11. The method of claim 10, wherein the diluent comprises at least one of a glycol, a glycol ether, 1,1,1,2,2,3,3,4,4-nonafluoro-4-methoxybutane, 1,1,1,2,2,3,3,4,4-nonafluoro-4-ethoxybutane, 3-ethoxyperfluoro (2-methylhexane), 1H,1H,5H-Octafluoropentyl-1,1,2,2-tetrafluoroethyl ether, and 1,1,1,2,3,4,4,5,5,5-Decafluoropentane.

12. The method of claim 1, wherein the gas comprises hydrogen.

13. The method of claim 12, wherein the diluent comprises at least one of a glycol, a glycol ether, 1,1,1,2,2,3,3,4,4-nonafluoro-4-methoxybutane, 1,1,1,2,2,3,3,4,4-nonafluoro-4-ethoxybutane, 3-ethoxyperfluoro (2-methylhexane), 1H,1H,5H-Octafluoropentyl-1,1,2,2-tetrafluoroethyl ether, and 1,1,1,2,3,4,4,5,5,5-Decafluoropentane.

14. A method of reducing friction on a metal surface of an apparatus that stores or transports a gas, the method comprising:
   (a) contacting the surface either directly or through an intermediate organometallic layer with a fluorinated material in a diluent, wherein the fluorinated material has the following structure:

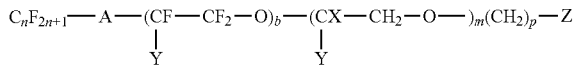

wherein A is an oxygen radical or a chemical bond; n is 1 to 20; Y is H, F, $C_nH_{2n+1}$ or $C_nF_{2n+1}$; X is H or F; b is at least 1, m is 0 to 50, p is 1 to 20, and Z is an acid group or an acid derivative;

(b) forming a hydrophobic surface layer on the metal surface; and (c) introducing the gas into the apparatus, wherein in the apparatus comprises a component of a closed loop $CO_2$ geothermal well, a storage well, a pipe, or an injector well, and wherein the fluorinated material is dissolved or dispersed in a diluent to form a solution or dispersion, and the solution or dispersion is coalesced on the surface to form the hydrophobic surface layer, and wherein Z is

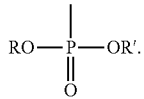

where R and R' are each independently H, a metal or an amine or an aliphatic or substituted aliphatic radical having 1 to 50 carbons or an aryl or substituted aryl radical having 6 to 50 carbons.

15. The method of claim 14 wherein n is 1 to 6; b is 5 to 12, m is 1 to 6, and p is 2 to 4.

16. The method of claim 14 wherein the fluorinated material in the hydrophobic surface layer is adhered to an intermediate organometallic layer.

* * * * *